(12) United States Patent
Phan

(10) Patent No.: US 6,661,429 B1
(45) Date of Patent: Dec. 9, 2003

(54) DYNAMIC PIXEL RESOLUTION FOR DISPLAYS USING SPATIAL ELEMENTS

(76) Inventor: Gia Chuong Phan, Sonnenallee 63, 12045 Berlin (DE)

( * ) Notice: Subject to any disclaimer, the term of this patent is extended or adjusted under 35 U.S.C. 154(b) by 0 days.

(21) Appl. No.: 09/151,287

(22) Filed: Sep. 11, 1998

(30) Foreign Application Priority Data

Sep. 13, 1997 (DE) ......................................... 197 41 132

(51) Int. Cl.$^7$ ................................................. G09G 5/04
(52) U.S. Cl. ..................................................... 345/694
(58) Field of Search ............................... 345/33, 38, 42, 345/43, 44, 47, 48, 55, 90, 112, 113, 116, 132, 133, 134, 135, 136, 149, 150, 152, 153, 154, 694, 696, 698; 348/739, 742, 743, 745, 781, 790, 791, 805, 806, 808, 832

(56) References Cited

U.S. PATENT DOCUMENTS

| | | | | |
|---|---|---|---|---|
| 4,564,915 A | * | 1/1986 | Evans et al. ................. | 364/521 |
| 4,853,592 A | * | 8/1989 | Strathman ................... | 313/495 |
| 5,113,274 A | | 5/1992 | Takahashi et al. | |
| 5,132,674 A | * | 7/1992 | Bottorf ........................ | 340/728 |
| 5,559,529 A | * | 9/1996 | Maher ......................... | 345/136 |
| 5,847,684 A | * | 12/1998 | Strik ............................ | 345/58 |

FOREIGN PATENT DOCUMENTS

| | | | | |
|---|---|---|---|---|
| DE | 3606404 A1 | * | 9/1986 | ............ G09G/3/20 |
| EP | 0 273 995 | | 7/1988 | |
| EP | 637009 A2 | | 2/1995 | |
| EP | 0 738 089 | | 10/1996 | |
| EP | 0 903 717 | | 3/1999 | |
| FR | 2 742 910 | | 6/1997 | |
| JP | 0637009 A2 | * | 2/1995 | ............ G09G/3/36 |

* cited by examiner

Primary Examiner—Jeffery Brier
Assistant Examiner—G. F. Cunningham
(74) Attorney, Agent, or Firm—Birch, Stewart, Kolasch & Birch, LLP

(57) ABSTRACT

The display comprises pixels and dots. Pixels are generated dynamically. Dynamic pixels are generated variable from existing dots. By combining adjacent dots, pixels form a dynamically generated logical unit, with adjacent pixels overlapping physically.

19 Claims, 3 Drawing Sheets

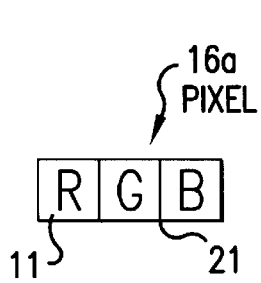
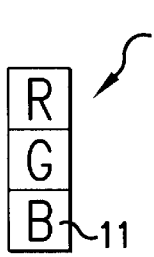
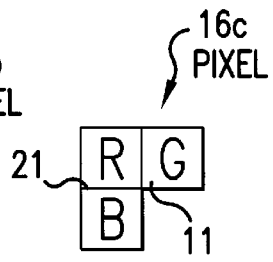
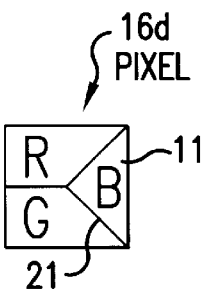
FIG.3a  FIG.3b  FIG.3c  FIG.3d
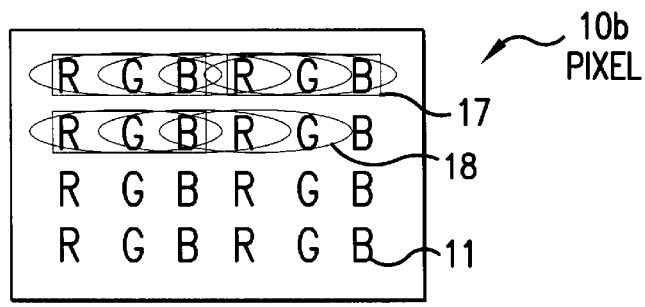
FIG.4a
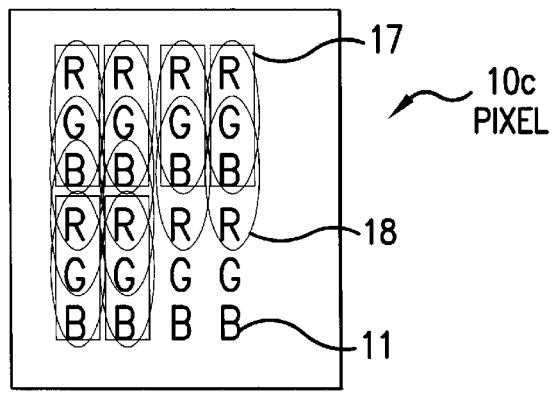
FIG.4b
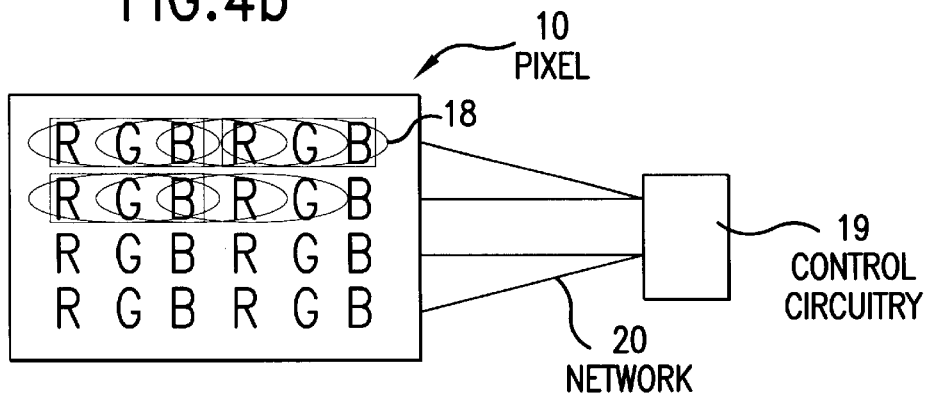
FIG.5

DYNAMIC PIXEL RESOLUTION FOR DISPLAYS USING SPATIAL ELEMENTS

BACKGROUND OF THE INVENTION

1. Field of the Invention

The invention relates to a display comprising pixels and dots, as well as a method for controlling the display.

2. Related Art

In known displays of the kind used in video, film and computer technology, so-called pixels are arranged along horizontally and/or vertically extending lines. The pixels generally consist of so-called dots representing the three basic colours red, green and blue. Dots are sources of luminous radiation the light of which is mixed to generate luminous mixed colours in a process referred to as additive mixing.

In computer monitors and television receivers the display is divided into a plurality of pixels arranged on a fixed grid or raster. Each pixel is controlled individually, with the pixels addressed from left to rightand from the top to the bottom, for instance, as is customary practice for CRT screens.

EP 0 637 009 A2 discloses a method of controlling active LCD displays in which the dots are arranged in a mutually offset pattern to form a delta shape, with the dots of each colour group vertically interconnected by control line. Horizontal control is effected pixel-wise, meaning that the three dots of each RGB pixel are addressed at the same time. Further, each dot comprises a memory element and a switching element, whereby RGB data can be transmitted using synchronizing information, as is the case in conventional monitors, for example.

DE 36 06 404 A1 discloses a method of generating picture elements on a colour display, as well as a colour display. The method uses a light gate array of which the light gates are addressable individually by means of control circuitry in such a manner that the desired colour itensity is obtained by controlling the transmission properties of the respective light gate. Light sources are disposed behind the light gate to provide at least two primary colours and are switched in alternating light cycles at a repetition rate of at least 25 Hz, with the light gates being controlled synchronously therewith. Because of the inertia of the human eye, it is possible for a gate to display the desired colour.

One drawback of this kind of display is that the number of pixels is limited by the fixed grid, which limits the resolution and the picture sharpness as well. The finer the grid, the higher the resolution. The fineness of the grid itself is limited by manufacturing technology, however, because the cathode ray tubes that are used for the displays comprise so-called shadow masks having holes therein which cannot be reduced to what-ever size unless one puts up with considerable expenditures.

Likewise, in LCD displays, the integration of a great number of transistors is extremely expensive and very prone to produce major amounts of rejects.

In LED displays, the placement of the LEDs is complicated and expensive as their space demand is predetermined by their shape.

SUMMARY OF THE INVENTION

It is the object of the present invention to provide a display of the aforesaid kind which has a higher optical resolution for a given grid.

The above object is achieved by a variable generation of pixels from existing dots, said pixels forming a dynamically generated logical unit by grouping adjacent dots so that adjacent pixels are physically superimposed. In the process, the generation of the dynamic pixels takes place at a rate high enough not to be perceivable by the human eye.

A dynamic pixel is supposed to consist of at least as many dots that it comprises all the basic colours given by those dots.

It is another object of the present invention to provide a method which enables an enhanced resolution to be obtained for dot-addressed displays.

This object is achieved specifically by a dynamic generation of pixels wherein a one-pixel logical unit is formed by grouping adjacent dots, with adjacent pixels being physically superimposed and the dynamic pixels being generated by sequential addressing at a rate such that said generation is not perceivable by the human eye.

When selected to be assembled into a group, the dots are chosen so that adjacent pixels overlap partly only. As a result, another dynamic pixel will be formed between existing, normally static pixels. The pixels are combined in a manner such as to comprise all basic colours provided by the dots.

Further advantageous measures are described in the dependent claims. The invention is shown in the attached drawings and is described hereinafter in greater detail.

BRIEF DESCRIPTION OF THE DRAWINGS

FIGS. 3a–d show various forms of a pixel comprising the three basic colour dots red, green and blue;

FIGS. 4a–b show various forms of a display featuring different pixel forms, with the well-known static pixels shown within squares and the dynamic pixels of the present invention shown in oval shapes;

FIG. 5 shows a display addressed by control circuitry connected to the dot via a network;

DETAILED DESCRIPTION OF THE PREFERRED EMBODIMENTS

Figures 1A, 1B, 1C:
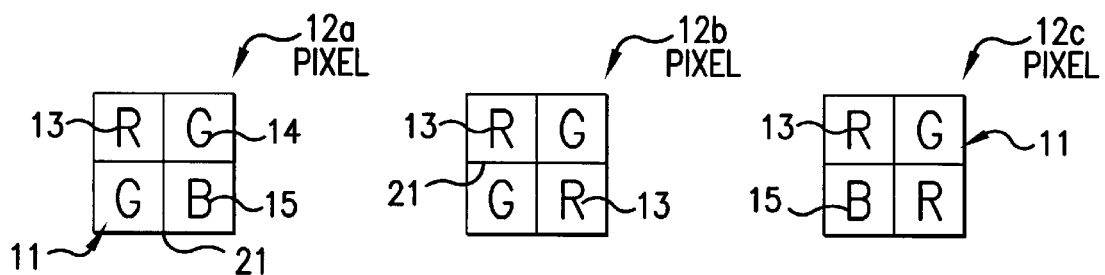
FIGS. 1a–c show various forms of arranging four dots within a square pixel.

As shown in FIGS. 1a to 1c, pixels 12a, 12b and 12c have a square shape. Pixels 12a, 12b and 12c comprise regularly disposed dots 11 radiating the basic colours red (red dot 13), green (green dot 14) and blue (blue dot 15).

In FIG. 1b, the pixel consists of red dots 13 and green dots 14 only. Preferably, each dot 11 is surrounded by a mask 21 to obtain a higher contrast between the dynamic pixels 18. The precise arrangement of the various colour dots 13, 14, 15 is not critical; care should be taken, however, that the arrangement of the different dots 13, 14, and 15 should be identical in each static pixel 17 within a display 10

Figure 2A:
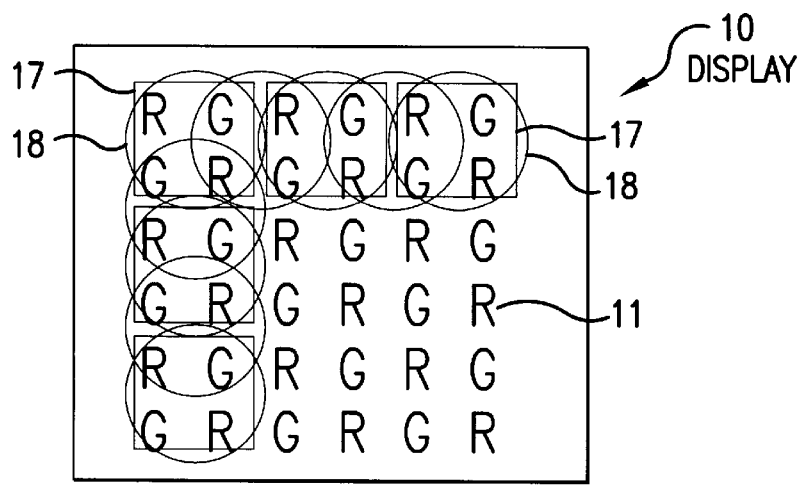
FIGS. 2a–b show various embodiments of a display with square pixels, with the well-known static pixels being shown within squares and the dynamic pixels of the invention within circles.
Figure 2B:
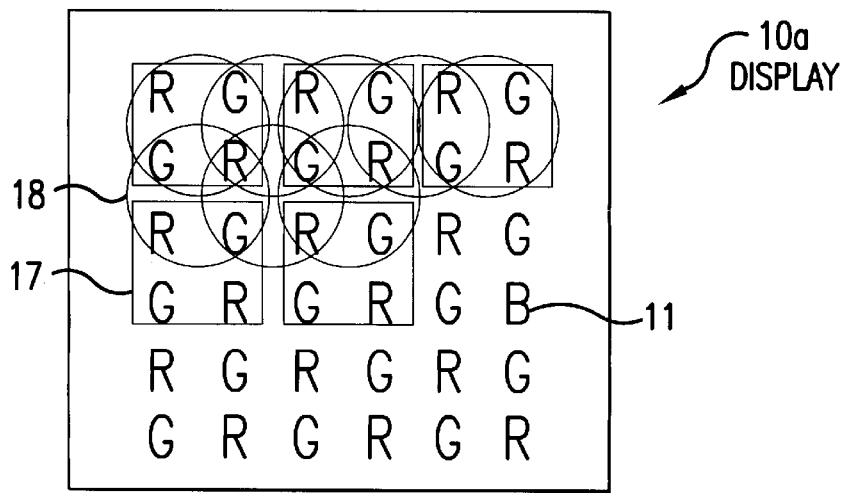

FIGS. 2a and 2b show displays 10 and 10a having square static pixels 17. Static pixel 17 correspond to a well known grid pattern or raster of display 10 or 10a. The dynamic pixels 18 shown in a circular form represent the inventive configuration of display 10 or 10*a*. Each dynamic pixel 18 comprises three dots 13, 14 and 15 representing the basic colours, as does each static pixel 17.

In contrast to static pixels 17, the dynamic pixels 18 overlap; they should not overly each other completely, however. High-frequency addressing of the dynamic pixels 18 will cause the human eye to be tricked into perceiving a more exact representation of the displayed picture.

In a display comprising rectangular pixels 12*a*, 12*b*, 12*c*, the resolution is increased by:

$$P=(x-1)*y+(2x-1)*(y-1)$$

pixels, with x being the number of horizontal pixels and y the number of vertical pixels.

In the displays of FIGS. 2*a* and 2*b*, this value would be:

$$P=(3-1)*3+(2*3-1)*(3-1)=6+10=16$$

As a result, this display has a resolution of 25=16+9 instead of 9 points.

Using the above formula, in a situation wherein dynamic pixels are arranged in the quad arrangement shown in FIGS. 2*a* and 2*b*, the resolution of a typical display screen having 640×480 pixels can be enhanced by a factor of nearly four (4) times to become 1279×959 dynamic pixels. Again, this enhanced resolution is accomplished by tricking the human's eye with the overlapping of a plurality of different dynamic pixels within one refresh cycle of the screen.

FIGS. 3*a* to 3*d* show various forms of pixels 16*a*, 16*b*, 16*c* and 16*d* each comprising three dots 11 for generating the three basic colours. Dots 11 are separated by masks 21 to obtain sharp and well-defined contours.

The dynamic pixels 18 should preferably be formed to comprise the same number of dots 11. The spatial arrangement of the different colour dots 13, 14, 15 is not critical. Pixels comprising only two basic colours in the form of dots, for example, would suffice for a less than full colour display of the kind shown in FIG. 1*b*.

FIGS. 4*a* and 4*b* show displays 10*b* and 10*c* formed of pixels 16*a* and 16*b*, with the increase in resolution being less pronounced than in the case of the aforesaid square form.

FIG. 5 shows a display 10 connected to control circuitry 19 through a network 20. Control circuitry 19 allows known dot-addressed displays to be used, of which the resolution will be increased by the invention.

In the inventive displays, each dot has a receiver of its own (not shown) to convert digital information transmitted through network 20 into luminous intensity levels for dots 11.

Network 20 preferably is an optical fiber network. The control circuitry 19 combines adjacent dots 11 to form a dynamic pixel 18 in order to then address these as a logical unit. Addressing involves high-frequency repetition, preferably at a rate of 100 Hz.

The inventive display can be used also for interlaced signals to combine the picture (frame) from even and odd fields 24, with odd field 24 composed of odd-numbered lines 22 and even field 24 of even-numbered lines 23.

Figure 6:
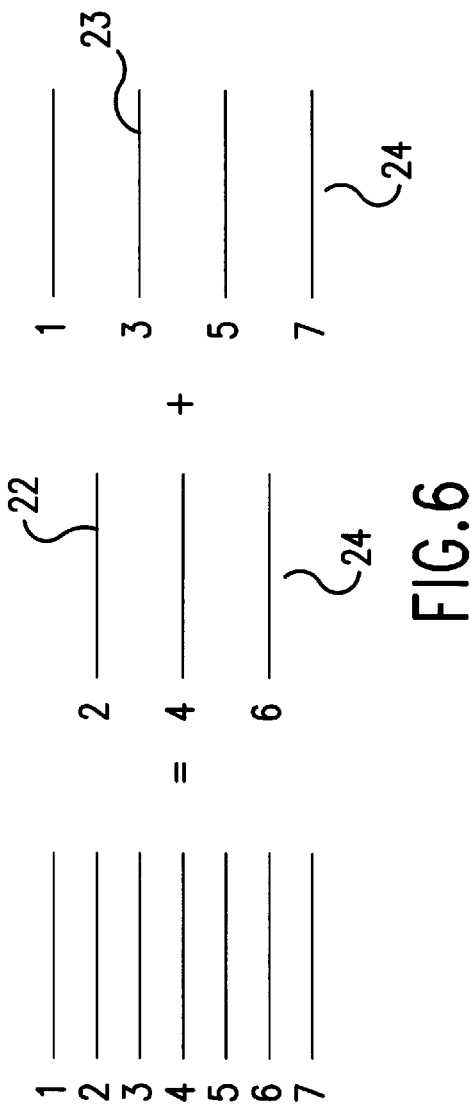
FIG. 6 shows the interlaced signal sequence in the generation of a frame from two fields.
Figure 7:
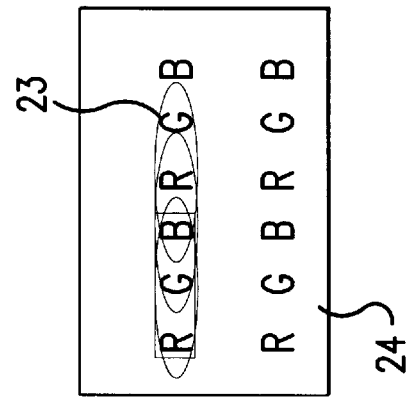
FIG. 7 shows the interlaced signal sequence in the generation of the inventive dynamic pixels.
Figure 7:
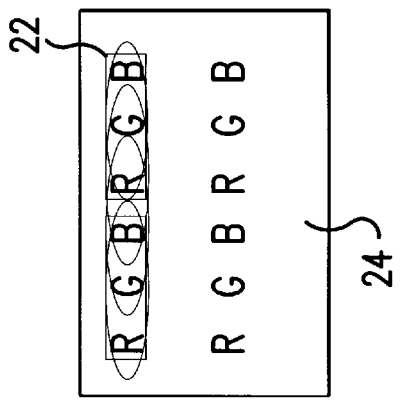
Figure 7:
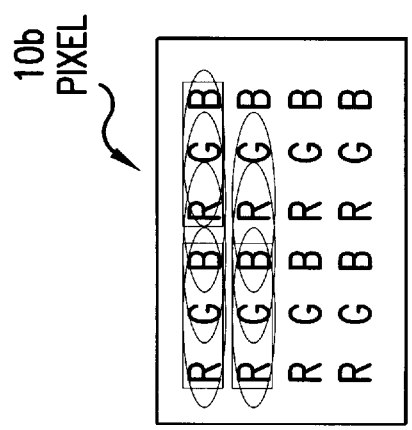

The inertia of the human eye causes a picture to form which is composed of two fields 24. FIG. 6 shows the theoretical and FIG. 7 the inventive composition using dynamic pixels 18. Other pixel shapes are contemplated.

| Reference Characters | |
| --- | --- |
| 10, 10a, 10b, 10c | display |
| 11 | dot |
| 12a, 12b, 12c | pixel |
| 13 | red dot |
| 14 | green dot |
| 15 | blue dot |
| 16a, 16b, 16c, 16d | pixels |
| 17 | static pixel |
| 18 | dynamic pixel |
| 19 | control unit |
| 20 | network |
| 21 | mask |
| 22 | odd-numbered line |
| 23 | even-numbered line |
| 24 | field |

What is claimed is:

1. A display, comprising:

first pixels each including a plurality of dots grouped in a predetermined manner, wherein each group of dots grouped in a predetermined manner is formed identically; and second pixels variably and dynamically generate from dots forming the first pixel groups, at least one second pixel includes a plurality of dots selected from two adjacently situated first pixels, wherein each first pixel does not share common dots, and wherein the dynamically-generated second pixels are superimposed over the first pixels vertically and horizontally in a symmetric way, thus enabling a symmetrically enhanced resolution in a vertical and a horizontal direction for a given resolution to be obtained for a given resolution for dot addressed displays.

2. A display, comprising:

a plurality of static pixel groups, each static pixel group of the plurality of static pixel groups comprising a plurality individual elements grouped in a predetermined manner identical to other static pixel groups in the plurality of static pixel groups; and a plurality of dynamic pixel groups, at least one dynamic pixel group of the plurality of dynamic pixel groups comprises a plurality of individual elements selected from two adjacently situated pixel groups of the plurality of static pixel groups, wherein each one of the plurality of static pixel groups do not share individual elements from other individual static pixel groups, and wherein the dynamically-generated second pixels are superimposed over the first pixels vertically and horizontally in a symmetric way, thus enabling a symmetrically enhanced resolution in a vertical and a horizontal direction for a given resolution to be obtained for a given resolution for dot addressed displays.

3. The display according to claim 2, wherein each static pixel group of the plurality of static pixel groups includes individual elements having one of the colors red and green.

4. The display according to claim 2, wherein each static pixel group of the plurality of static pixel groups includes individual elements having one of the colors red, green and blue.

5. The display according to claim 2, wherein each static pixel group consists of four individual elements.

6. The display according to claim 5, wherein two of the four individual elements are green and the other two elements are red.

7. The display according to claim 5, wherein two of the four individual elements are green, one element is blue and another is red.

8. The display according to claim 2, wherein each group in the plurality of static pixel groups and in the plurality of dynamic pixel groups is comprised of individual elements arranged in a horizontal straight line.

9. The display according to claim 2, wherein each group in the plurality of static pixel groups and in the plurality of dynamic pixel groups is comprised of individual elements arranged in vertical straight line.

10. The display according to claim 2, wherein each dynamic pixel group of the plurality of dynamic pixel groups comprises individual elements constituting another dynamic pixel group of the plurality of dynamic pixel groups.

11. The display according to claim 2, wherein at least one static pixel group comprises a first group of four individual elements and at least one dynamic pixel group comprises a second group of four individual elements, wherein the first and second groups include the same four individual elements.

12. The display according to claim 2, wherein each dynamic pixel group of the plurality of dynamic pixel groups includes individual elements having one of the colors red, green and blue.

13. The display according to claim 2, further comprising a control unit for controlling a luminous intensity of each individual element.

14. A method for controlling a display, comprising the steps of:
generating a plurality of static pixel groups, each static pixel group of the plurality of static pixel groups comprising a plurality individual elements grouped in a predetermined manner identical to other static pixel groups in the plurality of static pixel groups; and
generating a plurality of dynamic pixel groups, at least one dynamic pixel group of the plurality of dynamic pixel groups comprises a plurality of individual elements selected from two adjacently situated pixel groups of the plurality of static pixel groups, wherein each one of the plurality of static pixel groups do not share individual elements from other individual static pixel groups, and
wherein the dynamically-generated second pixels are superimposed over the first pixels vertically and horizontally in a symmetric way, thus enabling a symmetrically enhanced resolution in a vertical and a horizontal direction for a given resolution to be obtained for a given resolution for dot addressed displays.

15. The method according to claim 14, wherein each static pixel group of the plurality of static pixel groups includes individual elements having one of the colors red, green and blue.

16. The method according to claim 14, wherein each static pixel group of the plurality of static pixel groups includes individual elements having one of the colors red, green and blue.

17. The method according to claim 14, wherein each dynamic pixel group of the plurality of dynamic pixel groups comprises individual elements constituting another dynamic pixel group of the plurality of dynamic pixel groups.

18. The method according to claim 14, wherein at least one static pixel group comprises a first group of four individual elements and at least one dynamic pixel group comprises a second group of four individual elements, wherein the first and second groups include the same four individual elements.

19. The method according to claim 14, further comprising the step of controlling a luminous energy of each individual element.

* * * * *